Figure 1A:
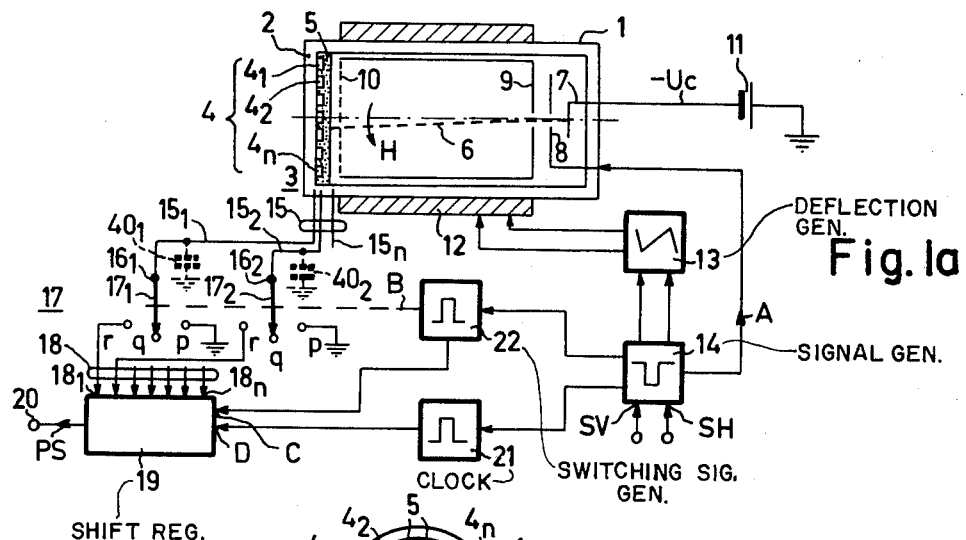

United States Patent van de Polder et al.

[11] 4,059,840
[45] Nov. 22, 1977

[54] TELEVISION CAMERA AND PICK-UP TUBE HAVING STRIPES FOR IMPROVED RESOLUTION AND LINEARITY

[75] Inventors: Leendert Johan van de Polder; Sing Liong Tan, both of Eindhoven, Netherlands

[73] Assignee: U.S. Philips Corporation, New York, N.Y.

[21] Appl. No.: 681,548

[22] Filed: Apr. 29, 1976

[30] Foreign Application Priority Data

Feb. 11, 1976  Netherlands .................. 7601361

[51] Int. Cl.² .................. H04N 9/07; H04N 5/30
[52] U.S. Cl. .................. 358/48; 358/44; 358/217
[58] Field of Search .................. 358/93, 44, 48, 223, 358/217; 178/7.2, DIG. 42; 313/370

[56] References Cited
U.S. PATENT DOCUMENTS

| 3,878,324 | 4/1975 | Tubbs et al. | 178/DIG. 42 |
|---|---|---|---|
| 3,921,206 | 11/1975 | Bohm et al. | 358/44 X |
| 3,969,763 | 7/1976 | Tan | 358/44 X |

*Primary Examiner*—John C. Martin
*Assistant Examiner*—Aristotelis M. Psitos
*Attorney, Agent, or Firm*—Frank R. Trifari; Henry I. Steckler

[57] ABSTRACT

A black-white or color television camera has a pick-up tube having a signal electrode comprising separate strips. Before a line scanning operation to be performed by an electron beam takes place, the signal electrode strips are coupled to a reference potential. After the line scan, the strips which are coupled separately to parallel inputs of a switching circuit which is provided with switches coupled to the parallel inputs, are coupled for supplying video information. This results in a separation between electron beam scanning and picture signal supply by the pick-up tube, which has the advantage that the beam scanning does not affect the picture quality in the direction of line scan. Furthermore, the construction with strips yield an improved signal-to-noise ratio. The switching circuit may, possibly together with a shift register, be integrated in a semiconductor body, which is provided near the signal electrode in the pick-up tube or outside the pick-tube.

15 Claims, 10 Drawing Figures

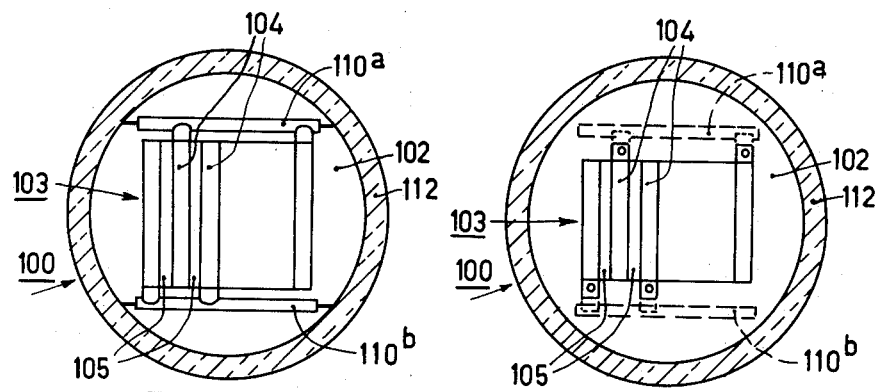
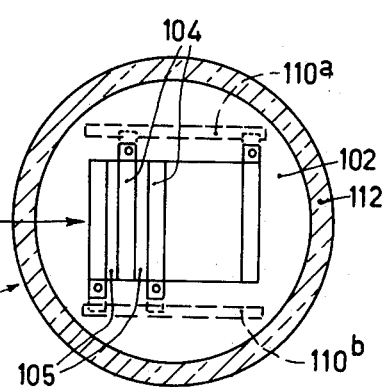
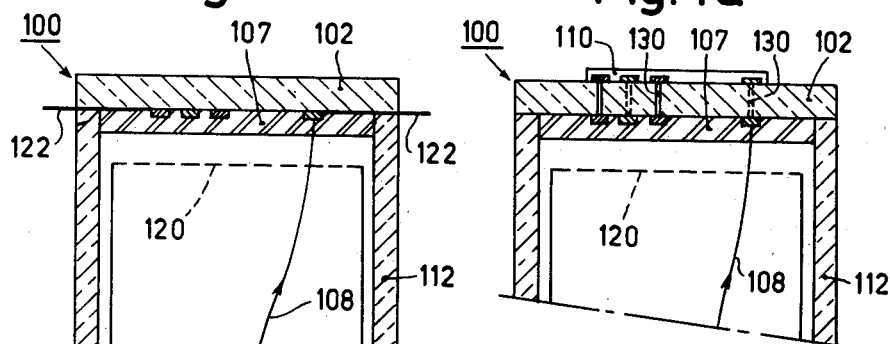
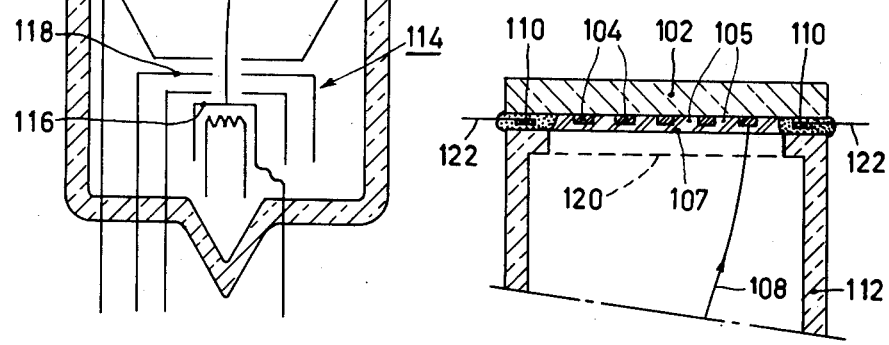
Fig. 3a  Fig. 4a  Fig. 3b  Fig. 4b  Fig. 5

TELEVISION CAMERA AND PICK-UP TUBE HAVING STRIPES FOR IMPROVED RESOLUTION AND LINEARITY

The invention relates to a television camera comprising a pick-up tube which is provided with an electron gun for generating an electron beam, with deflection means for deflecting the electron beam and with a target plate composed of a photosensitive layer to be scanned by the electron beam and a signal electrode which is applied in the form of electrically conducting strips which are insulated from each other, whilst line scanning is effected across successive strips, and to a pick-up tube provided with signal electrode strips.

U.S. Pat. No. 2,446,249 describes a construction of a pick-up tube which can be utilized as the sole tube in a colour television camera. For that purpose the isolated strips of the signal electrode are grouped into three groups by means of a through-connection of each strip to the third next strip so that three combs of strips are produced. Applied before the strips of the three groups or combs are colour filter strips which pass red, green and blue light respectively through which the light derived from a scene to be televised is processed into a potential image consisting of three partial images on the target plate layer to be scanned. With the transverse line scanning the diameter of the electron beam is equal to three times the strip width. The three groups of strips of the signal electrode or the three interlocking combs are connected each to an output of the pick-up tube at whose three outputs picture signals are produced which correspond with a red, green and blue coloured scene reproduction respectively.

An object of the invention is to realize a television camera provided with a pick-up tube having a signal electrode applied in the form of strips, which camera tube can be used to advantage in both a black-white and colour television camera. The television camera according to the invention is therefore characterized in that the strip of the signal electrode are separately coupled to associated parallel inputs of at least a switching circuit provided with switches connected to the parallel inputs and with a switching signal generator for controlling the switches, so that prior to a line scan of the target plate by the electron beam, the signal electrode strips have been connected to a reference potential through the switching circuit and that after a local line scan has been effected by the electron beam at a signal electrode strip, the switch which is connected to the associated parallel input, is closed for passing on information.

Starting first with a line scan with the electron beam transversely of the direction of the strips of the signal electrode and thereafter, for the passing on of information, connecting all strips through the parallel inputs of the switching circuit yields the advantage that non-linearities in the line scan in no way affect the generation of the picture signal and consequently do not produce distortions in the reproduced picture on reproduction. The geometry of the reproduced picture in the direction of line scan is fully determined by the relative position of the signal electrode strips.

It further applies that the diameter in the direction of line scan of the electron beam which scans the target plate, may be of any size and in no way affects the resolution in the direction of line scan at the reproduced picture. The resolution in the direction of line scan at the reproduced picture is determined by the number of strips of the signal electrode only.

As there are no requirements for the linearity of the deflection and the size of the diameter of the electron beam in the direction of line scan, these aspects need only be taken into account for the deflection in the direction of field scan, which implies that the linearity of the deflection and the size of the diameter of the electron beam in the direction of field scan can be improved at the cost of that in the direction of line scan.

As obtaining the picture signal at an output of the switching circuit is not directly coupled to the line scan in the pick-up tube but as they both occur shifted in the time, it is possible to perform the line scan at a higher speed only in a part of the normal line scanning time. The spare time obtained in this way may, for example, be utilized for signal processing the improve the signal-to-noise ratio or for other purposes.

Furthermore the normal line scan with an electron beam deflected in the line direction could be refrained from when an electron beam is formed having an elliptical landing spot, the axis of this ellipse being transversely of the direction of the strip and having such a length that all strips can be covered simultaneously. With a normal field scan which is to be performed in the normal manner in the direction of the strip by means of the deflection of the electron beam in the field direction, the electron beam is generated during part of each line period and blanked thereafter no deflection taking place in the line direction.

Compared with a conventional pick-up tube having a non-interrupted signal electrode or the strip-shaped signal electrode described which is subdivided into three combs, insulating the strips of the signal electrode from each other in accordance with the invention by connecting each of them separately to an input of the switching circuit offers the advantage that the capacitance of each separate strip, which is very small with respect to that of the non-interrupted or of the comb-shaped signal electrode, can be used. This results in an increase in the sensitivity of the pick-up tube. Namely, the sensitivity is determined by the signal-to-noise ratio which depends to a considerable extent on the magnitude of the signal source capacitance, in this case on the very small, and consequently favourable, strip capacitance. To obtain an optimum signal-to-noise ratio the input capacitance of the amplifier stage connected to the signal source must also be equal to the signal source capacitance so that, owing to the small strip capacitance, amplifier stages can be used which are constructed as an integrated semiconductor body.

The television camera according to the invention can be used in a colour television system by applying a colour strip filter having, for example, groups of strips which transmit red, green and blue light and which are positioned before the strips of the signal electrode. Herein, for example, only one switching circuit may be applied for supplying the composite colour picture signal which thereafter can be split in a simple manner into the three colour components as the position of the signal electrode strips with the given colour filters has been accurately determined. It is also possible to apply three switching circuits, one for each kind of colour filters and associated signal electrode strips. Compared with colour television cameras having a pick-up tube with three signal plate combs the television camera proposed has, besides the advantages already described, the further advantage that no cross-talk is produced for higher signal frequencies and the sensitivity has been improved by the described passing-on of information of the signal electrode strips which takes place after a scan through the associated parallel inputs of the switching circuit.

A pick-up tube for a television camera according to the invention is provided with an integrated circuit to which strips of the signal electrode have been connected. Such a circuit may be incorporated inside the pick-up tube envelope. Preferably, the entire target plate including the circuit is applied on an input faceplate intended for the pick-up tube, whereafter it is mounted as unit on a tube which comprises the electron gun. The integrated circuit may also have been applied outside the tube, then an electrically-conducting feed-through through the tube wall is required for each signal electrode strip. If so desired, the circuit can then be applied only after the tube has been tested. To offset the risk that the circuit is unfavourably affected by the photosensitive material or by the electron beam when mounted inside of the tube or that it is damaged during operation when the circuit is mounted outside the tube it is favourable to incorporate the circuit in the tube wall.

The invention will be further explained with reference to the following figures which are given by way of example, in which FIG. 1 relates to an embodiment of a television camera according to the invention, FIGS. 2a and 2b relate to a second embodiment of a part of the television camera according to the invention, FIGS. 3a, 3b, 4a, 4b and 5 relate to various embodiments of input screens having an integrated circuit according to the invention.

Figure 1B:
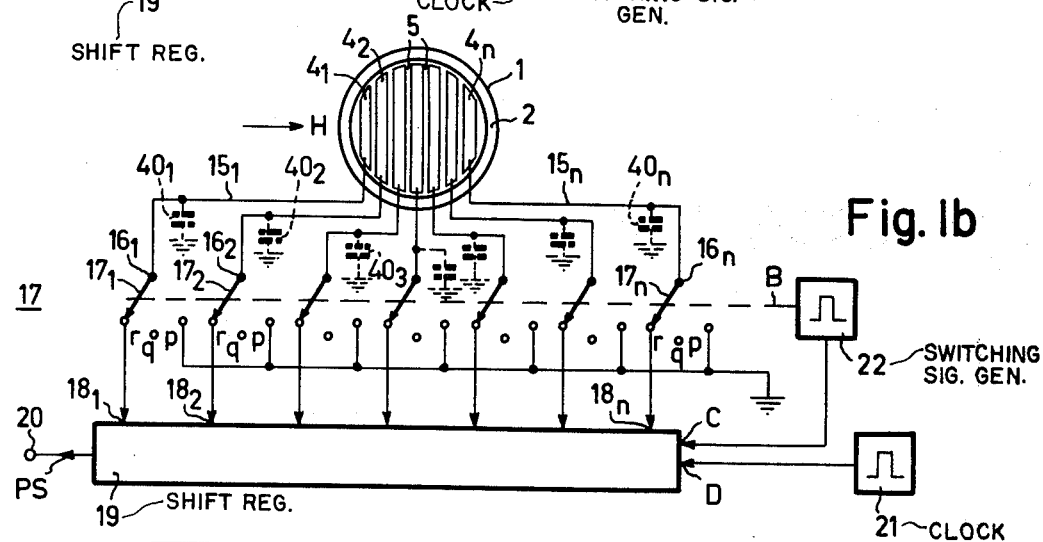
Figure 1C:
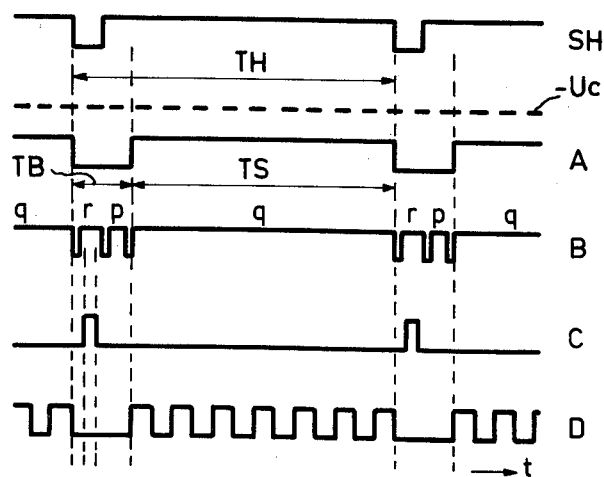

FIG. 1a and 1b in FIG. 1 show diagrammatically a part of a television camera which part is relevant for the invention, whilst FIG. 1c shows, as a function of the time $t$, the amplitudes of some signals produced. Reference numeral 2 indicates a transparent glass wall of a television pick-up tube 1. Applied to the glass wall 2 in the pick-up tube 1 there is a target plate 3 which is assembled from a signal electrode 4 consisting of transparent, electrically conducting strips $4_1, 2_2, \ldots$ to $4_n$ inclusive and from a photo-sensitive semiconductor layer 5. Light originating from a scene, not shown, is projected onto the photo-sensitive layer 5 through the glass wall 2. Starting from a voltage present between the signal electrode 4 and the free surface of the layer 5 a potential image corresponding with a reproduction of a scene is found on this surface which image is obtained through a leak in the layer 5 which leak depends on the local illumination. To scan the potential image on the target plate 3 an electron beam 6 is generated in the pick-up tube 1 by means of a cathode 7, a control electrode 8 and an accelerating electrode 9. To obtain a perpendicular landing on the target plate 3 of the electron beam 6 generated by an electron gun (7, 8, 9) formed in this way a gauze electrode 10 is applied near the target plate 3. For simplicity, terminals for the supply of voltage to the electrodes 9 and 10 have not been included in the drawing. It is shown that the cathode 7 is connected to a terminal of a voltage source 11, which terminal carries a negative voltage $-Uc$, another terminal of this voltage source being connected to chassis. Further, a signal A whose amplitude is plotted as a function of the time $t$ in FIG. 1i c, is supplied to the control electrode 8.

At the pick-up tube 1 deflection means 12 have been applied for a field- and (possibly) line deflection of the electron beam 6. The drawing shows the deflection means 12 in the form of deflection coils which are applied outside the pick-up tube 1; it is evident that instead of an electromagnetic an electrostatic deflection through electrodes present in the tube 1 could be applied. To scan the target plate 3 line by line and field by field, the deflection means 12 are connected to outputs of a deflection signal generator 13. For its control the deflection signal generator 13 is connected to outputs of a signal generator 14 to whose inputs a line drive signal SH and a field drive signal SV is supplied. In FIG. 1c the line drive signal SH is plotted with a line period TH which comprises a line scan time TS and a line blanking time TB. In the tube 1, during line scanning times TS, the electron beam 6 usually scans the target plate 3 in the direction of the line scan H at a cathode voltage $-Uc$, whilst in the times TB the electron gun (7, 8, 9) does not generate electron beam 6 by supplying, to the control electrode 8, of the signal A of FIG. 1c, pulses of which, as shown in the drawing, are negative with respect to the cathode voltage $-Uc$, which signal A is supplied by the signal generator 14. The field drive signal SV attends in a similar manner to a field deflection in a field deflection time which together with a field blanking time, constitute a field period.

For the construction of the television camera according to FIG. 1 described so far it applied that this construction is conventional. Herein the pick-up tube 1 which is provided with the signal electrode 4 is divided into the signal electrode strips $4_1, 4_2 \ldots 4_n$, applied in a colour television camera, a colour filter strip being applied before a strip $4_1, 4_2 \ldots 4_n$ which transmits, for example, red, green or blue light derived from the scene. In correspondance with groups of three colour filter strips formed in this way the signal electrode strips are divided into three groups which results in three combs of signal electrode strips. The three combs of signal electrode strips are each connected to an output of the camera tube, picture signals occurring at these three outputs which correspond with a red, green and blue coloured scane reproduction respectively.

For the conventional operation of a pick-up tube having a target plate constituted by a signal electrode consisting of one unit or by combs of signal electrode strips it applies that the signal electrode is connected, through a signal resistor to, for example, a supply terminal or a terminal having the chassis potential when the cathode has been connected to a terminal having a negative voltage, to obtain a voltage between the signal electrode and the free surface of the photo-sensitive layer. The local illumination of the photo-sensitive layer results in a leakage current which causes a charge transfer from the signal electrode to the given place on the free surface of the photo-sensitive layer. When the electron beam which scans the target plate line by line and field by field impinges on this given place this results in that the charge is removed from the free surface and, in that place, the voltage of the electron beam is impressed. The removal of charge is accompanied by a current-pulse through the signal resistor, the instantaneous voltage drop across the resistor producing the picture signal.

Instead of the conventional operation described of a pick-up tube, the tube 1 of FIG. 1a and 1b is operated in a fundamentally different manner, in which the application of the signal electrode strips $4_1, 4_2 \ldots 4_n$ can be done not only for a colour television camera but also with advantage for a black-white television camera. In accordance with the invention, in the television camera according to FIGS. 1a and 1b the strips $4_1, 4_2 \ldots 4_n$ of the signal electrode 4 are connected through terminals $15_1, 15_2 \ldots 15_n$ which are separated from each other, to separated terminals $16_1, 16_2 \ldots 16_n$ of switches $17_1, 17_2 \ldots 17_n$. For simplicity FIG. 1b shows $n = 7$, in practice n will be between 400 and 800. In FIG. 1b the strips $4_1, 4_2 \ldots 4_n$ are drawn as having straight edges; waving edges might likewise be used. In FIG. 1 the direction of line scan H is shown perpendicular to the strip direction of the signal electrode strips $4_1, 4_2 \ldots 4_n$ however, a scan in which the direction of the signal electrode strips $4_1, 4_2 \ldots 4_n$ is at an oblique angle to the direction of line scan H is likewise possible. To simplify the explanation of the operation the switches 17 are shown as three-pole switches $17_1, 17_2 \ldots$ whilst for each of them it applies that the associated terminal $16_1, 16_2 \ldots$ can be connected to a terminal p, q or r. In practice, the switches 17 will be constructed as electronic switches. The terminals p of the three-pole switches $17_1, 17_2 \ldots$ are all connected to chassis as reference potential, the terminals q are all separate, unconnected and the terminals r are separated from one another and connected to parallel inputs $18_1 \ldots 18_n$ of a storage device which is constructed as a parallel-in-series out shift register 19. The shift register 19 is provided with a series output 20. A control input of the shift register 19 is connected to the output of a clock pulse source 21 which supplied a signal D shown in FIG. 1c, under the control of a control signal, derived from the signal generator 14 of FIG. 1a. Also connected to the signal generator 14 there is a switching signal generator 22 which supplies a signal B, shown in FIG. 1c, to the switches 17 and a signal C to the shift register 19. At the signal B of FIG. 1c, p, q and r designate pulses having pulse durations in which the three-pole switches $17_1, 17_2 \ldots$ interconnect the terminals $16_1, 16_2 \ldots$ with terminal p, q or r. During the pulse duration of the pulses r of the signal B the signal C or FIG. 1c has a pulse of a shorter pulse duration which operates at the shift register 19 as a sampling pulse, during which the information offered to the parallel inputs 18 is entered into the shift register 19. It appears from the signal D of FIG. 1c that, after the information has been entered, the clock pulse source 21 supplies clock pulses to the shift register 19 for shifting the entered information to the series output 20 at which a picture signal PS then becomes available. Thus a switching circuit (16 to 22 inclusively) is formed with parallel inputs (16), switches (17), a storage device (19) constructed as a shift register having parallel inputs (18) and a storage output (20), and with the clock pulse source (21) and a switching signal generator (22).

The shift register 19 may be of a construction in which the information entered into a shift register stage becomes available at the output 20 by means of shifting by other stages or of a construction in which each shift register stage has a direct connection to the output 20.

Figure 2A:
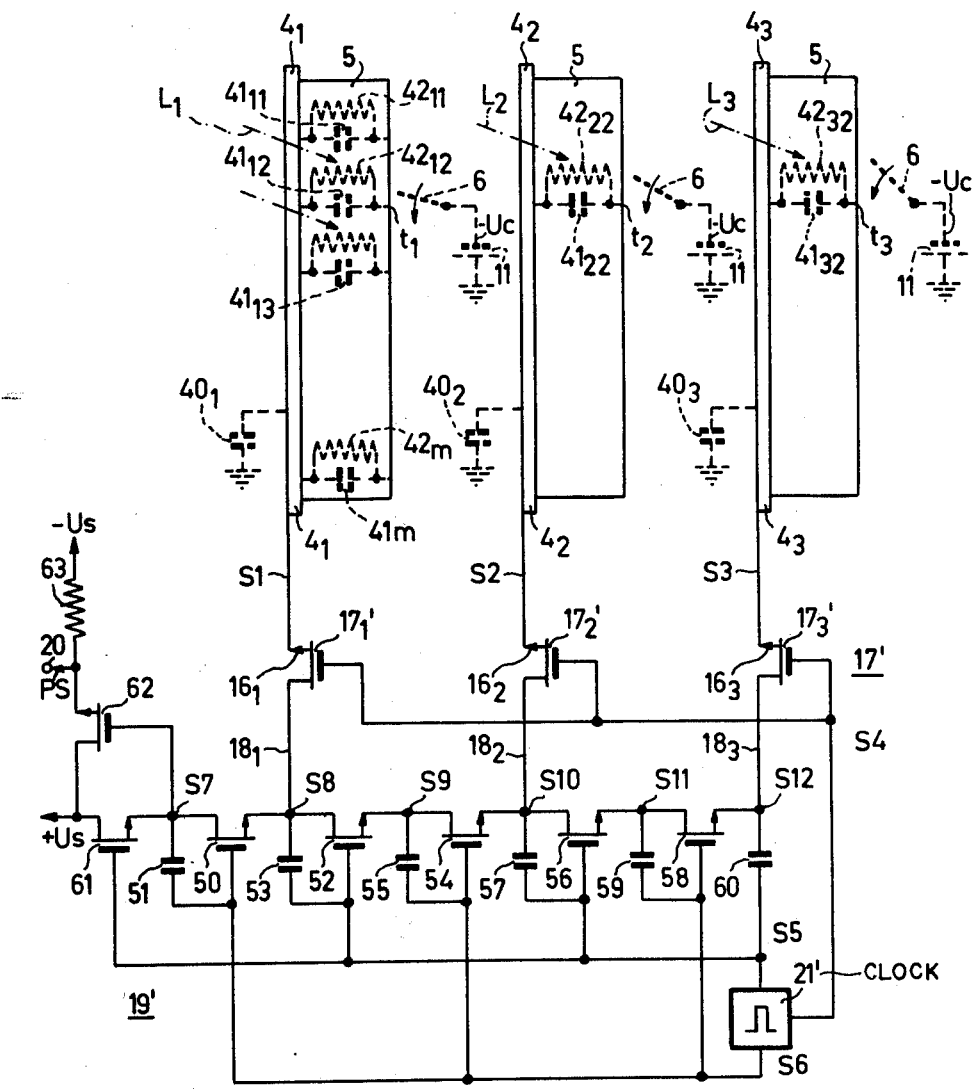
Figure 2B:
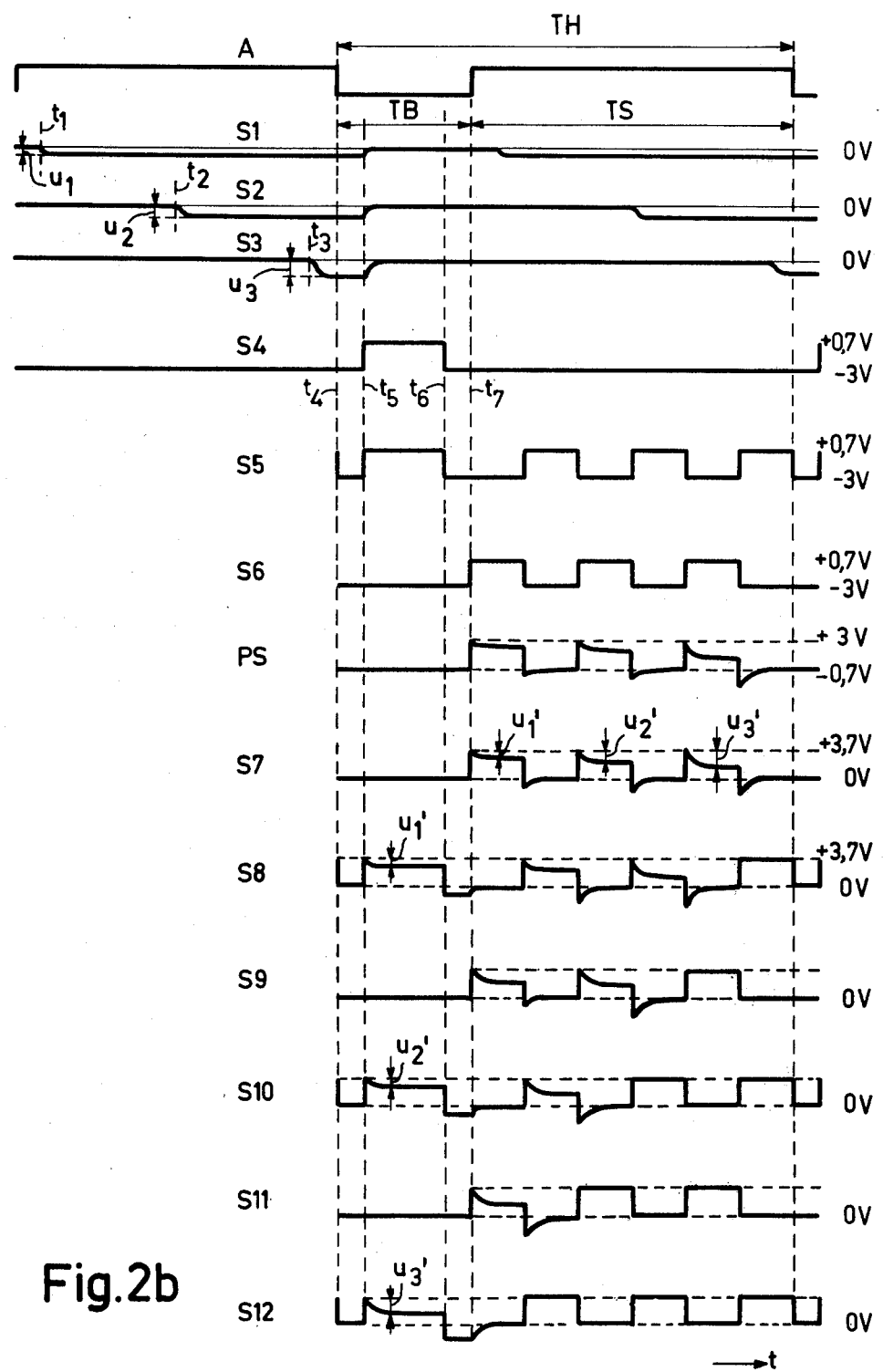

To explain the operation of the television camera according to FIGS. 1a and 1b, with the switching circuit (16 - 22) the following applies, reference being made to a part of FIG. 2a, namely that part where signal electrodes $4_1, 4_2$ and $4_3$ are designated and to a part of FIG. 2b where the amplitudes of signals A, S1, S2 and S3 are shown as a function of the time t. FIGS. 2a, 1a and 1b show some capacitances $40_1, 40_2, 40_3 \ldots 40_n$ which represent the capacitances of the signal electrode strips $4_1, 4_2, 4_3 \ldots 4_n$ and, as far as they must be taken into account, the connections $15_1, 15_2, 15_3 \ldots 15_n$ with respect to chassis. In the FIGS. 1a and 1b the connections 15 are indicated as they, owing to their feed-throughs through the glass wall of the camera tube 1, contribute in a way, which may not be neglected to the strip capacitance which, as will follow from the further description of FIG. 2, does not apply for the construction according to FIG. 2a.

Starting point is a situation in which the terminals p of the switches 7 are connected to the signal electrode strips $4_1, 4_2, 4_3 \ldots 4_n$ of FIG. 1a and 1b. The signal electrode strips $4_1 \ldots 4_n$ have been brought to ground potential, the capacitance $40_1 \ldots 40_n$ being discharged. It is further assumed that approximately one field period before the electron beam 6 has scanned a given place on the free surface of the photo-sensitive layer 5 and have raised it to the voltage $-Uc$. During the duration of the said field period light L (FIG. 2a) falls on the photo-sensitive layer through the transparent signal electrode strips $4_1, 4_2, 4_3 \ldots$. To explain the operation the photo-sensitive semiconductor layer 5 is considered to have been composed of a system of capacitances (41) which are present in parallel capacitance, each parallel having a photo-sensitive leakage resistor (42). At the signal electrode strip $4_1$ in FIG. 2a the capacitances $41_{11}, 41_{12} \ldots 41_m$ and the leakage resistors $42_{11}, 42_{12} \ldots 42_m$ are designated. As, to explain the operation, in particular the capacitances $41_{12}$ and the leakage resistor $42_{12}$ will be described, the corresponding capacitances $41_{22}$ and $41_{32}$ and leakage resistors $42_{22}$ and $42_{32}$ are designated at the signal electrode strips $4_2$ and $4_3$.

From the above it follows that the capacitances $41_{12}$, $41_{22}$ and $41_{32}$ have been brought to a voltage $-Uc$ a field period earlier and that, depending on the strength of a local illumination $L_1, L_2$ and $L_3$ these capacitances discharge across the leakage resistors $42_{12}, 42_{22}$ and $42_{43}$ during the duration of a field period so that locally the free surface of the layer 5 gets a voltage which is less negative than $-Uc$. In FIG. 2a, at the layer 5 the instance $t_1, t_2$ or $t_3$ are designated at which in a line scanning time TS, the switches $17_1, 17_2 \ldots$ being placed on the uncorrected terminal Q (FIG. 1a and 1b) the electron beam 6 is considered to impinge on the place indicated in that manner. In FIG. 2b the instants $t_1, t_2$ and $t_3$ are indicated at the signals $S_1, S_2$ and $S_3$ which signals represent the voltage present across the capacitances $40_1, 40_2$ and $40_3$. Prior to the instant $t_1$ indicated in FIG. 2b the ground potential of oV is found in the signal $S_1$ which potential has been obtained by the prior connection of the signal electrode strip $4_1$ to the terminal p. The discharge of the capacitance $41_{12}$, (or of any of the other capacitances $41_{11} \ldots 41_n$) which depends on the strength of the local illumination does not affect the voltage across the capacitance $40_1$ (signal S1). At the instant $t_1$ the electron beam 6 of FIG. 2a impinges on the indicated point which causes a circuit, having in series the voltage sources 11, the electron beam 6 and the capacitances $41_{12}$ and $40_1$, to be closed. The prior discharge of the capacitance $41_{12}$, which, for example, has resulted in a decrease in voltage of $u_{12}$ volt gives at the node of the series-connected capacitances $40_1$ and $41_{12}$, i.e. at the signal electrode strip $4_1$ a decrease in voltage which is equal to:

$$u_1 = (C\,41_{12}/C\,40_1 + C\,41_{12}) \cdot u_{12} \text{ volt.}$$

where $u_1$ is the decrease in voltage across the capacitance $40_1$ and $C...$ the value of the relevant capacitance. By way of Example it holds that with the cathode voltage $-UC = -40$ V for the electron beam 6 and a light dependant decrease in voltage across the capacitance $41_{12}$ of $u_{12} = 1V$ (whilst the voltage at $t_1$ on the layer 5 has become $-39V$ just before the beam 6 impinged) and $C$ $41_{12} = 0.005$ pF and $C$ $40_1 = 0.1$ pF, the decrease in voltage at the signal electrode strip $4_1$ or across the capacitance $40_1$ amounts to $u_1 = 47.6$ mV.

It is assumed that the intensities of the illuminations $L_2$ and $L_3$ are two and three times that of $L_1$ respectively and that there is no difference with the given capacitance values $C$ 40 and $C$ 41. Consequently a light-dependent decrease of voltage of $u_{22} = 2$ V across the capacitance $41_{22}$ or of $u_{32} = 3V$ across the capacitance $41_{32}$, after the instant $t_2$ or $t_3$ after the electron beam 6 has impinged, results in a decrease in voltage of $u_2 = 95.2$ mV and $u_3 = 142.8$ mV.

In the manner described for FIG. 1 the switches $17_1 \ldots 17_n$ (FIG. 1a and FIG. 1b) are switched over after the line scanning time TS from the terminals $q$ to the terminals $r$ as indicated at the signal B of FIG. 1c. During the time that the connection to the terminals $r$ is present the sampling pulse occurs in the signal C of FIG. 1c which causes the values of the voltage decreases $u_1, u_2, u_3 \ldots$ at the signal electrode strip $4_1, 4_2, 4_3 \ldots$ respectively to be entered into the shift register 19 by means of a voltage measurement. Thereafter the terminals $p$ which carry the ground potential of $oV$ as reference potential are connected to the signal electrode strips $4_1, 4_2, 4_3 \ldots$. In the next following line scanning time TS the entered information is shifted in the shift register 19 to the series output 20 under the control of the clock pulses in the signal D. The switches $17_1, 17_2 \ldots$ are then on the unconnected terminals $q$ and a line scan of the subjacent line takes place.

For completeness it must be noted that starting from the given decreases in voltage $u_1, u_2$ and $u_3$, followed by raising to ground potential implies that the places on the free surface of the layer 5 (FIG. 2a with places having instants $t_1, t_2$ and $t_3$) which have been brought to the voltage $-Uc$ for this purpose will get a voltage of $-Uc + u_1, -U_c + u_2$ and $-U_c + u_3$ respectively. Then these voltages are found as initial voltage across the capacitances $41_{12}, 42_{22}$ and $41_{32}$ instead of the voltage $-Uc$. It appears from the given values $-Uc = -40$ V and $u_3 = 1.5$ $u_2 = 3u_1 = 0.1428$ V that the difference in the initial voltage is very small and it further implies that the light-dependent leak at the capacitances 41 is not affected by small differences in voltage; the light-dependent leakage current has the character of a voltage source. For the given example, in which for all capacitances 41 the value $C41 = 0.005$ pF and for the capacitances 40 the 20-times larger value $C40 = 0.1$ pF it follows that of a light-dependent voltage decrease across the capacitance 41 only 1/21 is found on capacitance 40. It has been proved that after the exposure of the capacitance $41_{32}$ which results in a voltage decrease of 3V a voltage decrease of 142.8 mV is ultimately produced on the signal electrode strip $4_3$ having the capacitance $40_3$. If it is assumed that after this line scan, in the following duration of field periods no light is present in situ, the result is that, when a dark current is neglected, a decrease in voltage of 1/21 (142.8) = 6.8 mV is produced. This phenomenon results in a persistence effect at display which is fully acceptable with its approximately 5% of the preceding value.

Generating the picture signal as described with reference to the television camera of FIG. 1 has the following advantages.

Performing first, with the electron beam 6, a line scan transversely of the direction of the strips $4_1, 4_2 \ldots 4_n$ of the signal electrode 4 and the subsequent connection for information transfer, of all strips $4_1, 4_2 \ldots 4_n$ simultaneously to the parallel imputs $18_1, 18_2 \ldots 18_n$ of shift register 19 yields the advantage that non-linearities in the line scan in no way affect the generating of the picture signal PS and consequently do not cause distortions in the displayed picture on display. The geometry of the displayed picture in the direction of line scan H is fully determined by the position of the signal electrode strips $4_1, 4_2 \ldots 4_n$ relative to one another.

It further applies that the diameter in the direction of line scan H of the electron beam 6, which scans the target plate 3 may be of any size and does in no way affect the resolution in the direction of line scan in the display picture. The resolution in the direction of line scan in the displayed picture is only determined by the number of strips of the signal electrode 4.

As there are no requirements for the linearity of the deflection and the size of the diameter of the electron beam 6 in the direction of line scan H at deflection, these aspects need only be taken into account in the direction of field scan, which implies that the linearity of the deflection of field scan and the size of the diameter of the electron beam 6 in the direction of field scan can be improved at the cost of that in the direction of line scan.

As the providing of the picture signal at the series output 20 of the shift register 19 is not directly coupled with the line scan in the camera tube 1, but as both occur shifted in the time, it is possible to perform the line scan at a higher speed only in a part of the normal line scanning time TS. The spare time obtained in this manner may, for example, be utilized for signal processing to improve the signal-to-noise ratio or for other purposes.

Furthermore it would be possible to refrain from the normal line scan with an electron beam 6 deflected in the line direction H when an electron beam (6) is formed having an elliptical landing spot whose long axis is transversely of the strip direction and which has such a length that all strips $4_1, 4_2 \ldots 4_n$ are simultaneously covered. With a field scan which is performed in the normal manner in the strip direction by means of the deflection of the electron beams (6) in the field direction, the electron beams (6) is generated during a part of each line period and blanked for the other part, without a deflection in the line direction H taking place.

Compared with the conventional pick-up tube having a non-interrupted signal electrode or the strip-shaped signal electrode described, which is divided into three combs separating, in accordance with the invention, the strips $4_1, 4_2 \ldots 4_n$ of the signal electrode 4 by connecting them each separately to an input (18) of the shift register 19, offers the advantage of the use of the capacitance (40) of each said strip which is very small (C40) with respect to that of the non-interrupted or the comb-shaped signal electrode. This results in an increase in the sensitivity of the pick-up tube 1. The sensitivity is namely determined by the signal-to-noise ratio which depends to a considerable degree on the magnitude of the signal source capacitance, in this case on the very small and consequently favourable strip capacitance C40. To obtain an optimum signal-to-noise ratio the input capacitance of the amplifier stage connected to the signal source must further be equal to the signal source capacitance so that, owing to the small strip capacitance C40, amplifier stages can be used which are constructed as an integrated semiconductor body.

The television camera according to FIG. 1 is provided with a tube 1 whose signal electrode strips $4_1, 4_2 \ldots 4_n$ are each fed-out through the connections 15 through the glass wall to outside the pick-up tube 1 for connection to the parallel inputs 18 of the shift register 19 through the switches 17. It has been assumed that the shift register 19 operates on a measurement of the decrease in voltage at the signal electrode strip $4_1, 4_2 \ldots 4_n$. It is possible to apply the switches 17 and the shift register 19 near or on the target plate 3 in the pick-up tube 1. Furthermore, it is also possible to design the shift register 19 with a measurement of charge instead of a measurement of voltage at the parallel inputs 18, the information registration being accompanied by the simultaneous supply of the reference potential to the connected signal electrode strip $4_1, 4_2 \ldots$ or $4_n$. For this purpose a shift register 19' shown in FIG. 2a can be utilized which is designed as a charge transfer device constructed as an integrated semiconductor body whilst the strips $4_1, 4_2, 4_3 \ldots$ of the signal electrode 4 are connected at an end to the shift register 19' through switches ($17_1', 17_2', 17_3'\ldots$) with inputs $16_1, 16_2, 16_3 \ldots$ to the register parallel inputs $18_1, 18_2, 18_3 \ldots$ . For simplicity of the drawing, FIG. 2a only shows three signal electrode strips $4_1, 4_2$ and $4_3$ and the associated shift register 19', whilst a practical embodiment will comprise some hundreds of signal electrode strips $4_1, 4_2 \ldots 4_n$ and associated shift register stages. Furthermore, FIG. 2a shows by way of example a given embodiment of an integrated charge transfer device which operates with a given manner of charge transfer, also other embodiments are possible. By way of example it holds that no shift through the register stages to the output 20 is effected but that each register stage has a direct connection to the output 20 such as a charge injection-device (CID). Furthermore the shift register embodiment 19' of FIG. 2a might be combined with the switch embodiment 17 of FIG. 1a and 1b when a resetting to an external reference potential (terminals p) would be desired.

The shift register 19' of FIG. 2a is, in accordance with the circuit diagram shown, provided with a plurality of field effect transistors 50, 52, 54, 56 and 58 of the p-channel type which are each provided with an insulated gate electrode, a drain and a source indicated by means of an arrow, whilst between the gate electrode and the drain there is a capacitance 51, 53, 55, 57, or 59 respectively. The series arrangement has been formed by connecting the source of one transistor to the drain of the next higher transistor. The source of the transistor 58 is connected through a capacitance 60 to a node of the gate electrodes of the transistors 56 and 52 and to the gate electrode of a p-channel transistor 61 whose source is connected to the drain of the transistor 50 and whose drain is connected to a terminal having a supply voltage +Us. The drain of the transistor 50 is further connected to the gate electrode of a p-channel transistor 62 whose drain is connected to the terminal having the supply voltage +Us, the source being connected to a terminal having a supply voltage −Us, through a resistor 63. The node of the resistor 63 and the source of the transistor 62 is connected to the series output 20 of the shift register 19' at which the picture signal PS becomes available.

The node of the gate electrodes of the transistors 61, 52 and 56 and the terminal of the capacitance 60 is connected to a first input of a clock pulse source 21'. A second output of the clock pulse source 21' is connected to the gate electrode of the transistors 50, 54 and 58 whilst a third output is connected to the gate electrodes of the switches 17' which are constructed as p-channel transistors $17_1', 17_2'$ and $17_3'$. The source of the transistor $17_1', 17_2'$ or $17_3'$ is connected to the signal electrode $4_1, 4_2$ or $4_3$, the drain being connected to the source of the transistor 50, 54 or 58.

In FIG. 2b amplitudes of signals S1 to S12 inclusive and the picture signal PS are given as a function of the time $t$, which signals are produced in the circuit diagram according to FIG. 2a. The signals A, S1, S2 and S3 shown in FIG. 2b have already been described. In the description of FIG. 1 the signals S4, S5 and S6 are supplied, with a peak-peak value of, for example, −3 V to +0.7 V, to the gate electrodes of the transistors $17_1', 17_2', 17_3' \ldots$, 56, 52, 61 and 58, 54, 50 respectively by the clock pulse source 21'. The signals S7, S8, S9, S10, S11 and S12 are found on the sources of the transistors 61, 50, 52, 54, 56 and 58 with a peak-peak value of, for example, between 0V and +3.7 V.

To explain the operation of the circuit diagram of FIG. 2a the following applies. From the instants $t_1, t_2$ and $t_3$ the decreases in voltage $u_1, u_2$ and $u_3$ are found on the signal electrode strips $4_1, 4_2$ and $4_3$ with respect to the ground potential OV, as shown at the signals S1, S2 and S3 of FIG. 2b. At an instant $t_4$ the line blanking time $T_B$ starts which ends at an instant $t_7$, whilst in the time TB in the signals S4 and S5 a pulse is produced between the instants $t_5$ and $t_6$. It applies for shift register 19' that between the instants $t_4$ and $t_5$ the capacitances 51, 53, 55, 57, 59 and 60 are each charged to 3 V which follows from the presence of the voltage −3 V in the signal S5 and S6 and from the ground potential 0 V in the signals S7 to S12 inclusive. The pulse in the signals S4 and S5 between the instants $t_5$ and $t_6$ has a voltage of + 0.7 V. The voltage of + 0.7 V at the gate electrodes of the transistors $17_1'$ and $17_2'$ and $17_3'$ results in that, at a sufficiently high voltage at the drain, the voltage at the source, that is to say at the signal electrode strip $4_1$ and $4_2$ or $4_3$ connected therewith can increase to not more than the ground potential 0 V; the 0.7 V voltage is the threshold voltage which must be present between the gate electrode and the source to render the transistor conductive and to keep it so. The pulse edge occurring at the instant $t_5$ with the voltage jump from −3V to 0.7 V in the signal S5 produces, through the capacitances 53, 57 and 60 the same voltage jump of 3.7 V in the signals S8, S10 and S12. The voltage of +3.7 V obtained in this manner at the drains of the transistors $17_1', 17_2'$ and $17_3'$ give, together with the voltage of 0.7 V at the gate electrodes thereof, that the capacitances $40_1', 40_2, 40_3$ of the respective signal strips $4_1, 4_2$ and $4_3$ are charged to the ground potential 0 V (signals S1, S2 and S3 of FIG. 2b at the instant $t_5$) from the capacitances 53, 57 and 60 (signals S8, S10 and S12). It appears that the charge conditions corresponding with the decreases in voltage $u_1, u_2$ and $u_3$ at the capacitances $40_1, 40_2$ and $40_3$ are replenished from the capacitances 53, 57 and 60 and produce there decreases in voltage $u_1', u_2'$ and $u_3'$. For equal values of the capacitances $40$, and 53, 57 and 60 the decreases in voltage $u$ and $u'$ are equal.

The pulse having the voltage +0.7 V and which occurs between the instants $t_5$ and $t_6$ in the signal S5 results in that the transistors 61, 52 and 56 could be rendered conductive but for the fact that the capacitances 51, 55 and 59 which have been charged to 3V give already the ground potential 0 V in the signals S7, S9 and S11, so that the transistors 61, 52 and 56 remain blocked.

The voltage jump in the signals S4 and S5 at the instant $t_6$ results in that the transistors $17_1'$, $17_2'$ and $17_3'$ are blocked and that an equally large voltage jump occurs in the signals S8, S10 and S12.

At the instant $t_7$ the line scan time TS starts with, on the one hand, a line scan of the layer 5 by the electron beam 6, in situ of the capacitance $41_{13}$ etc., and, on the other hand, the charge transfer between the capacitance 51, 53, 55, 57, 59 and 60 under the influence of the pulses given in the signals S6 and S5 of FIG. 2b. So the voltage jump in the signals S6 at the instant $t_7$ gives that the transistors 50, 54 and 58 can be rendered conductive to give in the signals S8, S10 and S12 the ground potential 0 V by means of a charge transfer from the respective capacitances 51, 55 and 59 which have been plotted at the signals S7, S9 and S11 of FIG. 2b. The decrease in voltage $u_1'$ in the signal S7 also occurs in the picture signal PS through the transistor 62 which has been applied as source follower, but when with respect to a level (+3V) which the gate-source threshold voltage is 0.7 V lower. FIG. 2b shows that under the control of the pulses and the signals S5 and S6 in the line scan time TS the further decreases in voltage $u_2'$ and $u_3'$ are shifted to the capacitance 51 with the signal S7 and become available in the picture signal OS through the gate-source follower transistor 62.

In the television camera construction according to FIG. 1 and 2 the shift register 19 operates in the switching circuit (16 to 22 inclusive) as storage device. The use of a storage device (19) can be refrained from whilst retaining the advantages given above. For example, after the electron beam 6 has impinged on the target plate 3 at a given signal electrode strip (for example $4_x$) and thereafter moved a number of strips away, the relevant signal electrode strip ($4_x$) can be connected directly through the associated switch ($17_x$) to the output 20 for passing on information. Thereafter the turn has come for signal electrode strip ($4_{x+1}$) to be interconnected, thereafter for the strips ($4_{x+2}$, $4_{x+3}$, . . . ). The consecutive connection of the signal electrode strips $4_1$, $4_2$ . . . $4_n$ some time after the electron beam 6 has passed gives a sufficient separation between the beam scan and the signal release, to prevent the signal from being affected by the beam scan.

It is also possible to apply intermediate stages between the signal electrode strips $4_1$, $4_2$ . . . $4_n$ and the associated switches $17_1$, $17_2$ . . . $17_n$. Such a stage may result in that, when the electron beam 6 impinges on the target plate 3, this is accompanied by actuating a voltage source in the form of a current-to-current converter, connected with the signal electrode strip present there, so that the latter, after excitation in the above described manner, does not retain a voltage decrease ($u_1$) but that on excitation it is immediately compensated by a current to be supplied by the current source, which current is a measure for the decrease in voltage. In its simplest form, in the construction of the camera according to FIGS. 1 and 2, thoughts may go towards an npn-transistor whose emitter is connected to the associated signal electrode strip, the base is connected to earth and the collector to a terminal of a capacitance which terminal carries a sufficiently high bias voltage to make it possible for the transistor to conduct. The inputs 16 of the switches 17 can be connected to these capacitances, so that the signal electrodes $4_1$, $4_2$ . . . $4_n$ are coupled to the switches $17_1$, $17_2$ . . . $17_n$ through the intermediate stages.

The following applies to an embodiment of a pick-up tube shown in FIG. 3. An input screen 100 as shown diagrammatically in FIG. 3a comprises an input face plate 102 having a signal-electrode 103 which is applied to the input faceplate in the form of a uniform pattern of strips 104 consisting of transparent, electrically conducting material. The strips 104 are separated from each other by strips 105. A photo-conductive layer 107 is applied to the signal electrode pattern. The part of the input screen covered in this way can be scanned by an electron beam 108 in a manner which fully corresponds with known constructions. Generating and controlling the electron beam can be effected in known manner and need no further description here.

In contact with the target plate part which is provided with signal electrodes 104 an integrated circuit 110 has been applied, which, to safe room, is here divided into two parts 110a and 110b. The integrated circuit 110 fully corresponds or partly corresponds with the switching circuit (16 to 22 inclusive) of the FIGS. 1a, 1b or 2a. The strips 104 are alternatingly connected to parallel inputs of a part 110a or a part 110b respectively of the integrated circuit. In the circuit 110 here at least the part till the parallel-in shift register 19 of FIG. 1a, 1b or 19' of FIG. 2a is incorporated in the tube. For only thereafter the necessity of the large number of feed-through connections through the tube wall is no longer necessary. If it is favourable from the point of view of switching technique or construction, further switching elements may also be incorporated in the tube.

The input screen formed in this way can be mounted in known manner to a tube 112 which is provided with an electron gun 114 having the necessary electron optical elements such as a cathode 116, a control electrode 118 and a mesh electrode 120.

Feed-throughs 122 can be applied during the mounting operation, for example in a frit seal between the faceplate and the tube. These feed-throughs may also pass the input face-plate and be applied as such before the input faceplate and the further tube components are sealed together.

FIG. 4 shows an embodiment of a pick-up tube which is suitable for the camera described and which only deviates from the preferred embodiment shown diagrammatically in FIG. 3 in that the integrated circuit is here applied entirely outside the camera tube. When lead monoxide is used as photoconductive material this may be detrimental to the circuit. Furthermore, to reduce rejects in the production it may be favourable to apply the integrated circuit to a pick-up tube which is further satisfactory in all respects. Now for each signal electrode strip a separate feed-through 130 through the glass wall, in this case preferably through the input faceplate, must be present. These feed-throughs which may also be applied through the frit seal connect the signal electrodes again alternatingly to each of the two parts of the circuit. This is shown in FIG. 4b by the dotted and solid feed-throughs 130. The feed-throughs for supply- and discharge leads for the integrated circuit itself may here have been applied in the frit seal fully in accordance with the feed-throughs 122 in FIG. 3 but they may also, as the feed-throughs 130, be applied through the input faceplate. The integrated circuit may have been applied in any place at the outer wall of the pick-up tube and may also have been situated elsewhere, separate from the tube. Detrimental influences of substances applied at the inside of the tube and of free electrons on the integrated circuit have now been avoided. However, this is offset by the necessity of many feed-throughs. A favourable solution is obtained by applying the feed-throughs in a fibre-optic faceplate having a pattern of uniformly stacked fibres, in which the fibres used for the feed-through have been replaced by electrical conductors or have been omitted from the faceplate or have been etched away later on and the resulting feed-throughs have been metallized vacuumtight.

An embodiment in which many of the drawbacks of the two previously described examples have been avoided is shown diagrammatically in FIG. 5.

Here the integrated circuit 110 is incorporated in a wall part of the pick-up tube and consequently protected from both the outer air and the atmosphere in the camera tube. In the embodiment described herein at least a first part of the integrated circuit is incorporated in a frit seal of the tube. The connections of the signal plate strips to the circuit can now be applied fully in accordance with the embodiment described with reference to FIG. 3. Thus also here it is possible to first assemble the entire input faceplate as a separate unit. By using frit seals which are already active at relatively low temperatures it can be prevented that during assembly damage is caused to the integrated circuit. The circuit may also, for example, be applied further inwards on the input faceplate and be sealed off vacuumtight by means of a flat ring the actual frit seal for the phase plate remaining free. In all embodiments described use is made, for the integrated circuit, of a charged coupled parallel-in, series-out shift register but also other constructions are possible.

What is claimed is:

1. A television camera comprising a a pick-up tube including an electron gun means for generating an electron beam, and a target plate including a photo-sensitive layer to be scanned by the electron beam and a signal electrode having electrically conducting strips which are separated from each other, deflection means for providing a line scanning across successive strips by said beam, a switching circuit having parallel inputs separately coupled to the strips of the signal electrode respectively, and switches coupled to the parallel inputs, and a switching signal generator means for controlling the switches and for providing that prior to a line scan of the target plate by the electron beam the signal electrode strips are coupled to a reference potential through the switching circuit and for providing that after a local line scan by the electron beam of a signal electrode strip the switch which is coupled to the associated parallel input is closed for providing information.

2. A television camera as claimed in claim 1, wherein said switching circuit comprises a storage device having parallel inputs which are coupled to said switches, and a clock pulse source means for supplying a television picture signal to a storage output under the control of the storage device.

3. A television camera as claimed in claim 2, wherein the storage device comprises a parallel-in series-out type shift register.

4. A television camera as claimed in claim 3, wherein the reference potential is present at the parallel inputs of said register, and after the end of a line scan a decrease in voltage of the strips of the signal electrode occurs in accordance with the intensity of light locally incident on said target plate, the register parallel inputs being coupled to the signal electrode strips for supplying before the next line scan the reference potential to the strips of the signal electrode while the information is entered in the shift register simultaneously.

5. A television camera as claimed in claim 4, wherein the shift register comprises a charge transfer device which is integrated in a semiconductor body, and further comprising capacitances coupled to one end of the strips of the signal electrode through the switches and also being coupled to the register parallel inputs.

6. A television camera as claimed in claim 4, used in accordance with a television standard having a specified line scan time and line blanking time which together form a line period, wherein after a line scan of the target which occurs in the line scan time, the signal electrode strips are coupled in the next line blanking time to the parallel inputs of the shift register through the switches for providing the signal, the clock pulse source being operative in the subsequent line scan time for supplying the television picture signal to the output of the shift register.

7. A television camera as claimed in claim 1, wherein said switching circuit comprises two switching circuits disposed on either side of the strip ends of the signal electrode and which are each coupled alternatingly to another strip.

8. A television camera as claimed in claim 1, further comprising colour filter strips disposed at the signal electrode strips, said switching circuit comprising at least three switching circuits, a signal electrode strip and at least each third next strip being separately coupled from one another to successive parallel inputs of one of the three switching circuits.

9. A television pick-up tube comprising an envelope, a target plate disposed at one end of said envelope and including a photosensitive layer and a signal electrode comprising a plurality of adjacent strips, an electron gun means disposed at an opposing end of said envelope for generating an electron beam for scanning the target plate, and an integrated circuit having a plurality of parallel inputs separately coupled to the strips of the signal electrode respectively.

10. A pick-up tube as claimed in claim 9 wherein the integrated circuit is situated outside the tube envelope, and further comprising an electrically-conducting wall feed-through means for separately coupling said strips to the integrated circuit.

11. A pick-up tube as claimed in claim 10, wherein the integrated circuit is disposed at an outer wall section of the tube envelope.

12. A pick-up tube as claimed in claim 9, wherein at least a part of the integrated circuit up to said parallel inputs is disposed within the envelope of the pick-up tube, supply leads for output terminals being coupled to the circuit having electrically conducting wall feed-throughs.

13. A pick-up tube as claimed in claim 9, wherein at least a part of said integrated circuit is disposed in the wall section of the tube.

14. A pick-up tube as claimed in claim 9, wherein at least an input section of said integrated circuit comprises two parts, the signal electrode strips being alternatingly coupled to one of these parts.

15. A pick-up tube as claimed in claim 9, wherein the input faceplate comprises a fibre-optic plate, and further comprising wall feed-throughs including electrically conducting feed-throughs in place of some optical fibres in the input faceplate.

* * * * *